United States Patent
Crowe et al.

(10) Patent No.: US 6,846,591 B1
(45) Date of Patent: Jan. 25, 2005

(54) BATTERY CASING

(75) Inventors: Eliot Crowe, Gwent (GB); Roger James Knight, Chepstow (GB)

(73) Assignee: Hawker Energy Products Limited, London (GB)

( * ) Notice: Subject to any disclaimer, the term of this patent is extended or adjusted under 35 U.S.C. 154(b) by 0 days.

(21) Appl. No.: 09/937,067

(22) PCT Filed: Mar. 21, 2000

(86) PCT No.: PCT/GB00/00966
§ 371 (c)(1),
(2), (4) Date: Jan. 9, 2002

(87) PCT Pub. No.: WO00/57501
PCT Pub. Date: Sep. 28, 2000

(30) Foreign Application Priority Data

| Mar. 23, 1999 | (GB) | ................................................ | 9906536 |
| Dec. 3, 1999 | (GB) | ................................................ | 9928496 |

(51) Int. Cl.⁷ ................................................ H01M 2/12
(52) U.S. Cl. .............................. 429/53; 429/55; 429/72; 429/82
(58) Field of Search ................................ 429/53–55, 57, 429/71–72, 79, 82–85, 87–89, 175

(56) References Cited

U.S. PATENT DOCUMENTS

| 4,168,350 A | 9/1979 | Oxenreider et al. |
| 4,207,387 A | 6/1980 | Jutte |
| 4,338,383 A | * 7/1982 | Jutte et al. ..................... 429/88 |
| 4,600,664 A | 7/1986 | Cramer et al. |
| 5,380,604 A | 1/1995 | Hampe et al. |
| 5,464,701 A | 11/1995 | Rey |
| 5,702,841 A | 12/1997 | Thomas et al. |
| 6,025,086 A | * 2/2000 | Ching .......................... 429/82 |

FOREIGN PATENT DOCUMENTS

| EP | 0 503 264 A1 | 9/1992 |
| GB | 2 015 808 A | 9/1979 |
| GB | 2 042 249 A | 9/1980 |

\* cited by examiner

Primary Examiner—Michael Barr
Assistant Examiner—Monique Wills
(74) Attorney, Agent, or Firm—Myers Bigel Sibley & Sajovec

(57) ABSTRACT

A battery casing, particularly suitable for a lead acid type battery, comprises a lid having a recess insert into the top surface, at least one vent at the base of the recess through which gas is expelled from the battery, a cover for sealingly covering the recess and defining a gas collection space within the covered recess, guide means for guiding the gas from the collection space away from the battery wherein the cover may be positioned in more than one orientation.

14 Claims, 7 Drawing Sheets

BATTERY CASING

CROSS-REFERENCE TO RELATED APPLICATIONS

The present application is a U.S. national phase application of PCT International Application No. PCT/GB00/00966, having an international filing date of Mar. 21, 2000 and claiming priority to Great Britain Application Nos. 9906536.9 and 9928496.0 filed Mar. 23, 1999 and Dec. 3, 1999. The above PCT International Application was published in the English language and has International Publication No. WO 00/57501.

This invention relates to a battery casing, and in particular to a valve regulated lead acid battery casing.

During the operation of a lead acid battery, gases including hydrogen are expelled from the cell or cells. There is thus the danger of an explosive mixture of expelled hydrogen and oxygen in the air being formed near the battery. Further, the expelled gases may carry acid vapour or even droplets and there is the possibility of corrosion of metals outside the battery occurring.

It is an object of the present invention to provide a battery casing which prevents or reduces the effects of the above disadvantages.

In accordance with the invention a battery casing comprises a lid having a top surface and a recess inset into the said top surface, a vent at the base of the recess through which gas is expelled from the battery, a cover for sealingly covering the recess, a gas collection space being defined within the covered recess, and a guide means for guiding gas from the collection space away from the battery, wherein the cover may be positioned in more than one orientation.

Preferably a plurality of vents, e g one for each cell, is provided at the base of the recess.

Preferably the top surface of the cover lies no higher than the adjacent surface of the battery.

The guide means may comprise a nozzle protruding from the cover and to which a flexible tube may be attached.

One embodiment of the invention will now be described by way of example only, with reference to the accompanying drawings of which:

The battery illustrated has a shape and dimensions particularly allowing its use in standard telecommunications racking, for example, in accordance with ETSI Standards.

Figure 1:
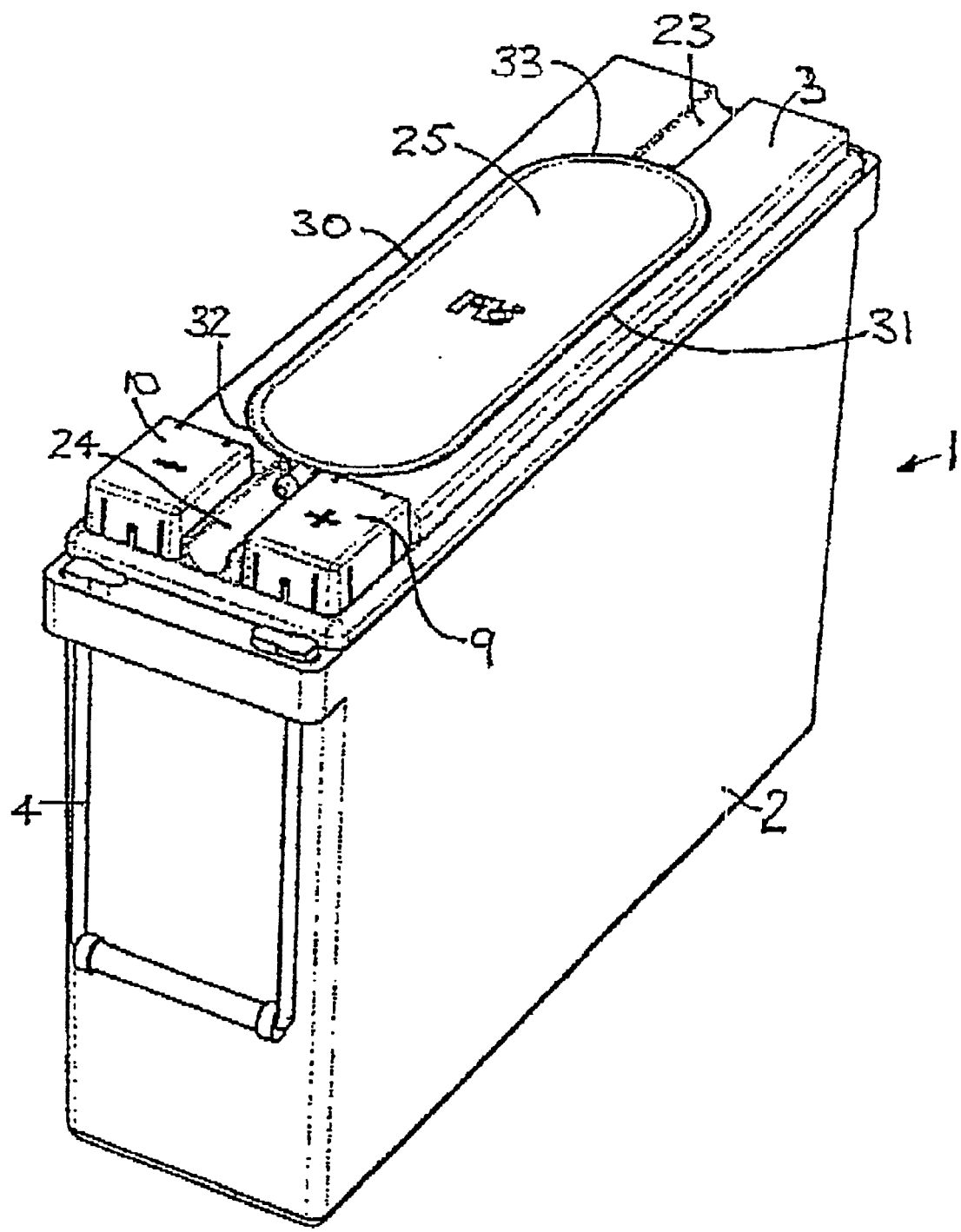
FIG. 1 is a perspective view of a battery having a casing according to the invention.
Figure 3:
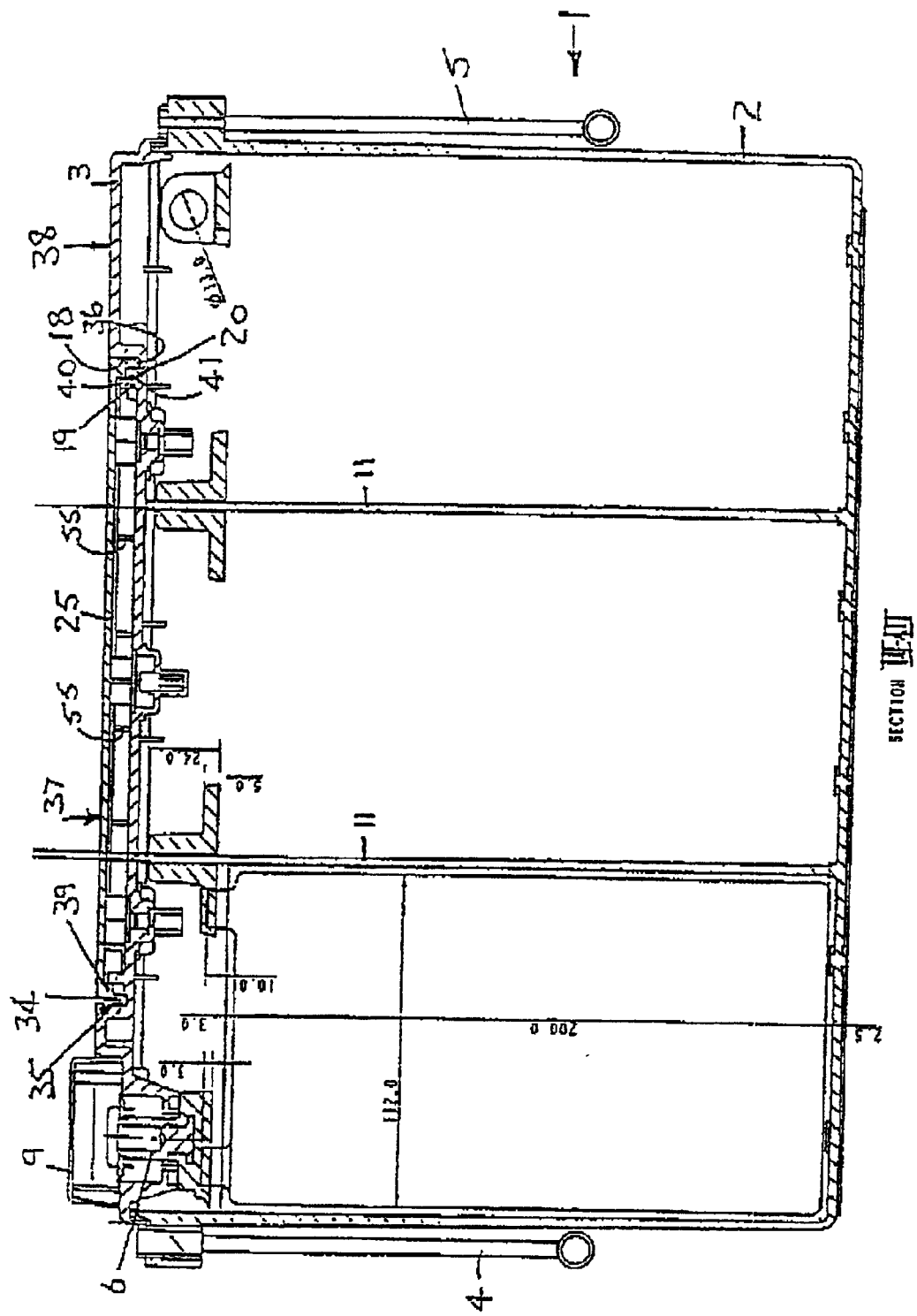
FIG. 3 is a cross-section on line III—III of FIG. 2.
Figure 4:
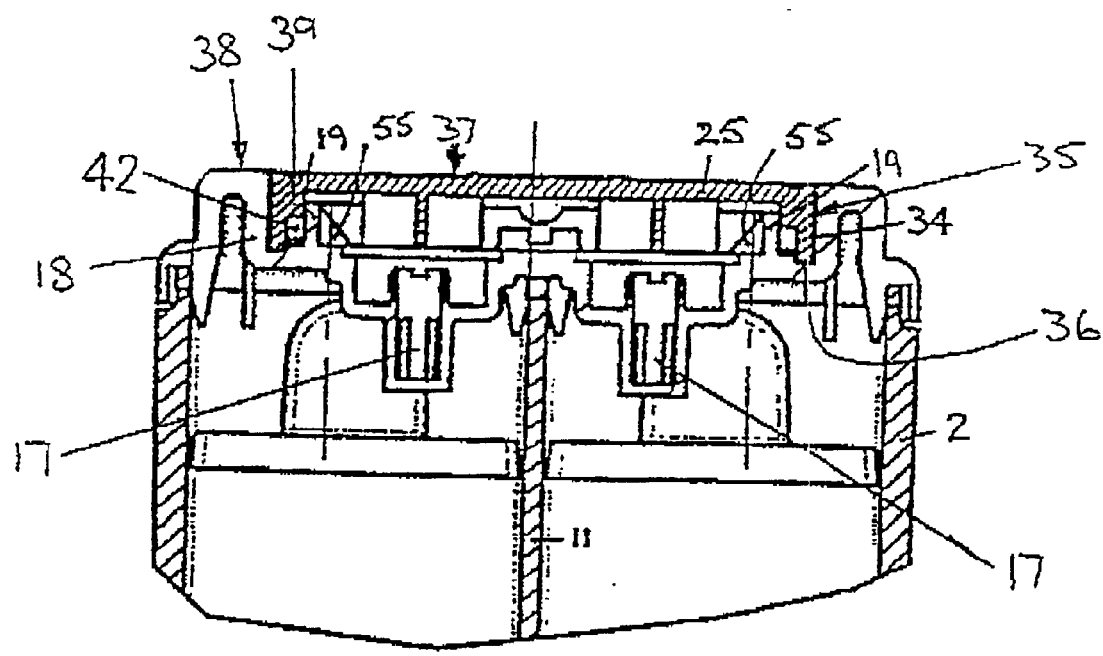
FIG. 4 is a cross-section on line IV—IV of FIG. 2.
Figure 5:
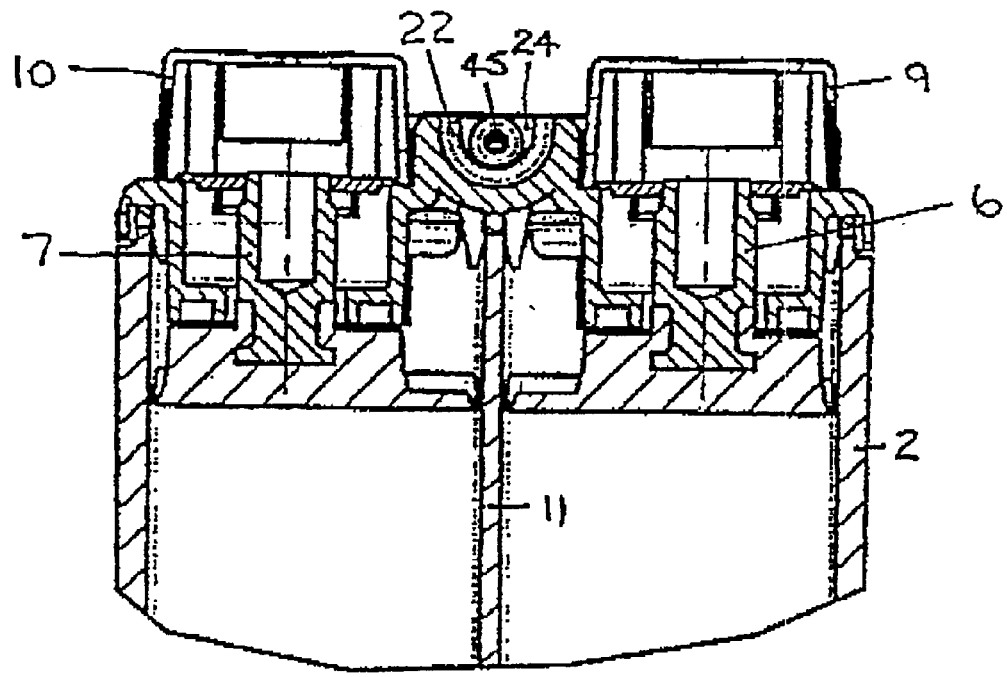
FIG. 5 is a cross-section on line V—V of FIG. 2.

As shown the battery having a casing 1 according to the invention comprises a rectangular box 2 having a lid 3 and two handles 4, 5 one at each end. The casing is made of moulded plastic material e g ABS. As viewed from the top (see FIG. 1) the battery has two long sides and two short sides. A positive terminal 6 and a negative terminal 7 are positioned on the top surface and close to one of the short sides. As shown particularly in FIG. 1, the terminals 6 and 7 are protected by box-like shields 9 and 10 respectively. The battery illustrated has six cells, so the casing is divided by internal walls 11, see FIGS. 3 and 4 particularly.

Figure 6:
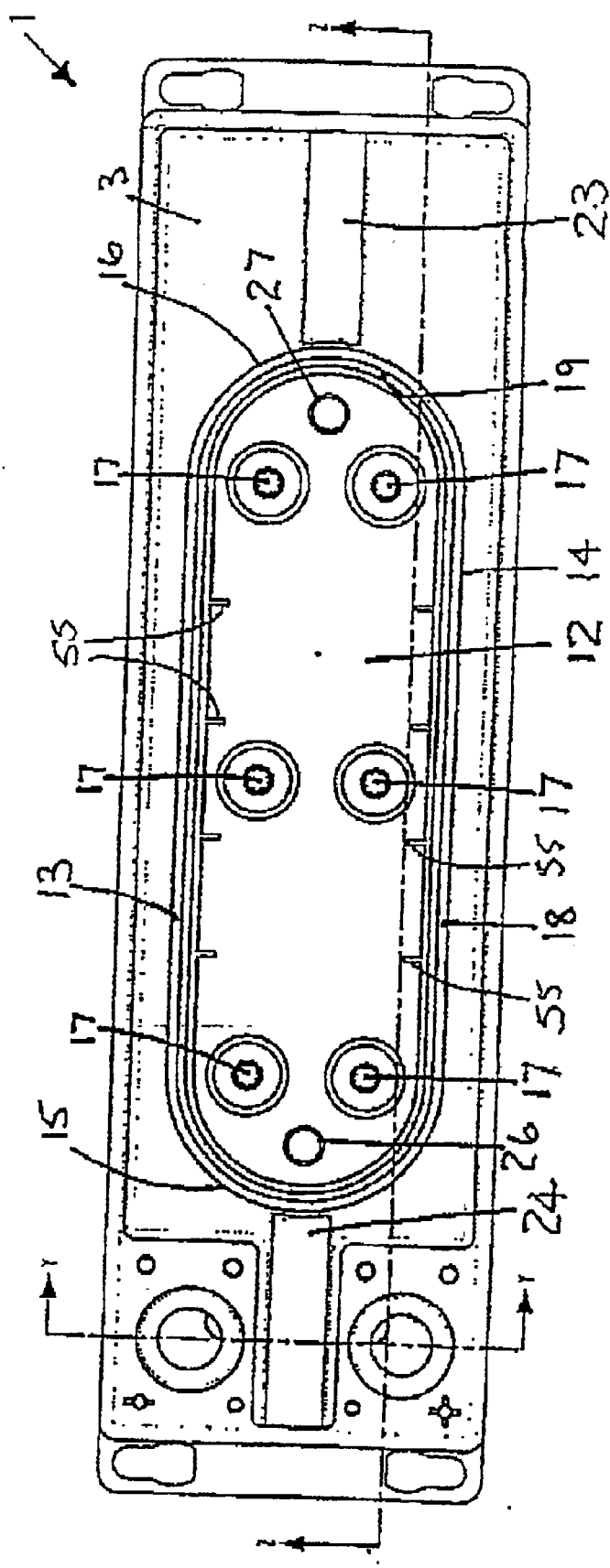
FIG. 6 is a plan view of the battery shown in FIG. 1 with the cover removed.
Figure 7:
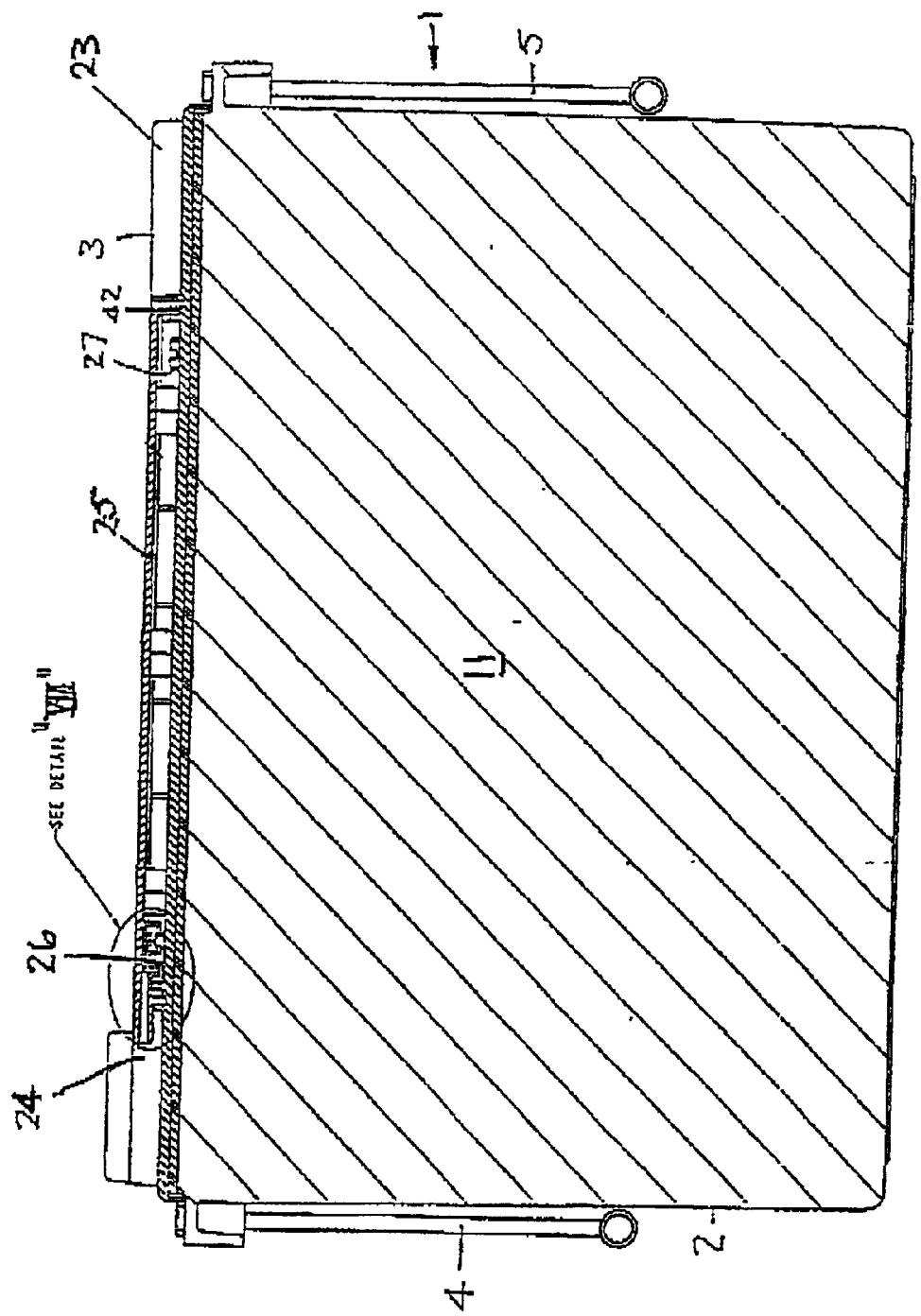
FIG. 7 is a cross-section on line VII—VII of FIG. 2.

Inset into the upper surface of the lid 3, is an elongated recess 12 having two straight parallel sides 13, 14 and semi-circular end parts 15, 16. The recess is formed in the lid by a suitable moulding operation and the two straight parallel sides of the recess lie parallel to the two long sides of the battery. At the base of the recess are six vents 17, one for each cell, and two flame arrester supports 26, 27. The supports are located one adjacent each end part of the recess and each comprises an upstanding circular flange 28 with four regularly spaced-apart openings 29 (see FIGS. 6 and 8).

The periphery of the recess is defined by a vertical wall 18. Inwardly of the wall is an upstanding flange 19 having a height less than that of the wall over most of the wall length. The straight parts of the flange 19 are provided on its inner side with a plurality of triangular buttresses 55 to provide rigidity. A groove 21 is defined between the flange and the wall and a shoulder 20 is formed within the groove 21 adjacent the flange 19. Thus the groove 21 has a deep portion adjacent the wall 18 and a shallow portion adjacent the flange 19.

Figure 8:
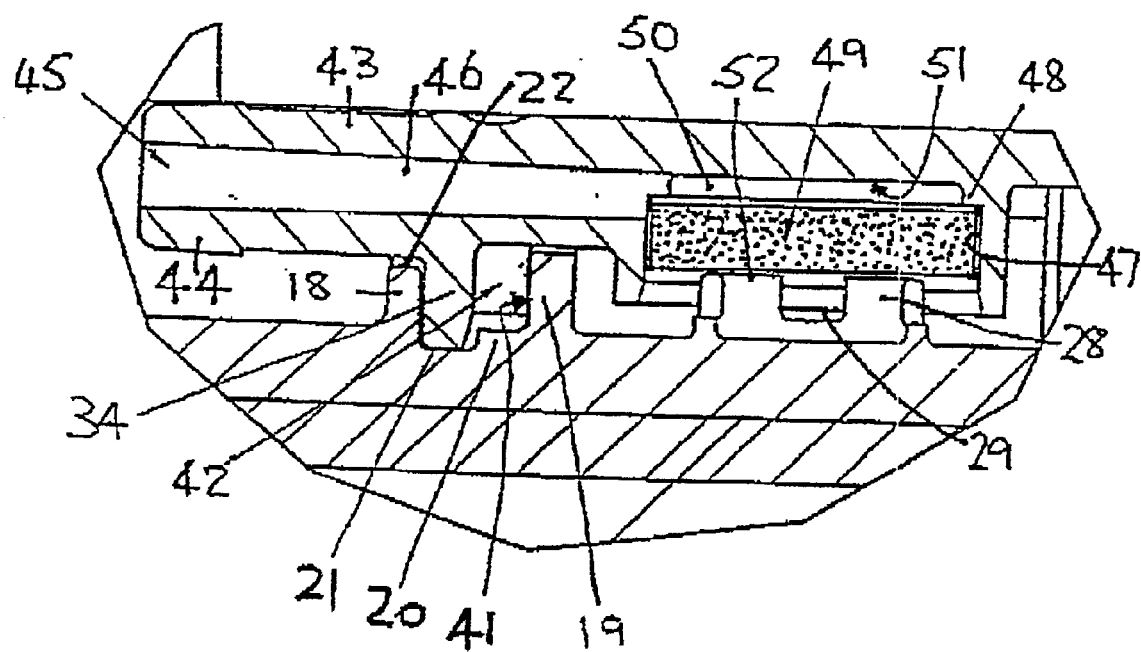
FIG. 8 is an enlarged view of detail VII of FIG. 7.

At the centre of both semi-circular end parts 15, 16 of the recess 2, the wall 18 is interrupted by a semi-circular depression 22 (see FIG. 8). Both depressions, one at each end of the recess as viewed in plan (see FIG. 6) lead into semi-circular cross-sectional channels 23, 24 moulded into the lid. Each channel extends along the mid-line of the battery towards the two narrow ends of the lid respectively. One channel, 24, leads between the two terminals 6 and 7 and their associated shields 9 and 10.

A cover 25 of similar material to the casing 1, is moulded to fit tightly into the recess 12 in the lid 3. The level of the upper surfaces of the lid 3 and of the cover 25 lies below the level of the tops of the shields 9 and 10 when the cover is positioned in the recess. Thus, like the recess 12, the cover 25 has two straight sides 30, 31 and two semi-circular ends 32, 33. Around the periphery of the cover 25 is a cover flange 34, the outer surface 35 of which engages the wall 18 of the recess. The cover flange 34 is the same depth as the wall 18 so that the lower extremity 36 of the cover flange 34 fits into the deep part 18 of the groove 20 and the upper surface 37 of the cover 25 is level with the upper surface 38 of the lid 3. The level of the upper surfaces of the lid 3 and of the cover 12 lies below the tops of the shields 9 and 10 when the cover is positioned in the recess. The cover flange 34 has a shoulder 39 on its inner side and over most of its length. This shoulder 39 has an inner surface 40 which lies alongside the outer surface 41 of the flange 19 in the recess 25 on the lid 3. As can be seen particularly in FIGS. 3 and 4, a rectangular cross-sectional channel 42 is defined between the inner surface of the cover flange, above the shoulder 20 in the groove 21 in the recess 12, outwardly of the flange in the recess and below the shoulder on the lid. An 'O' ring seal (not shown in the drawings) is located within the channel 42 to provide an air-tight seal between the cover 25 and the recess 12. Optionally, the cover 25 may be removed from the recess and subsequently replaced.

Figure 2:
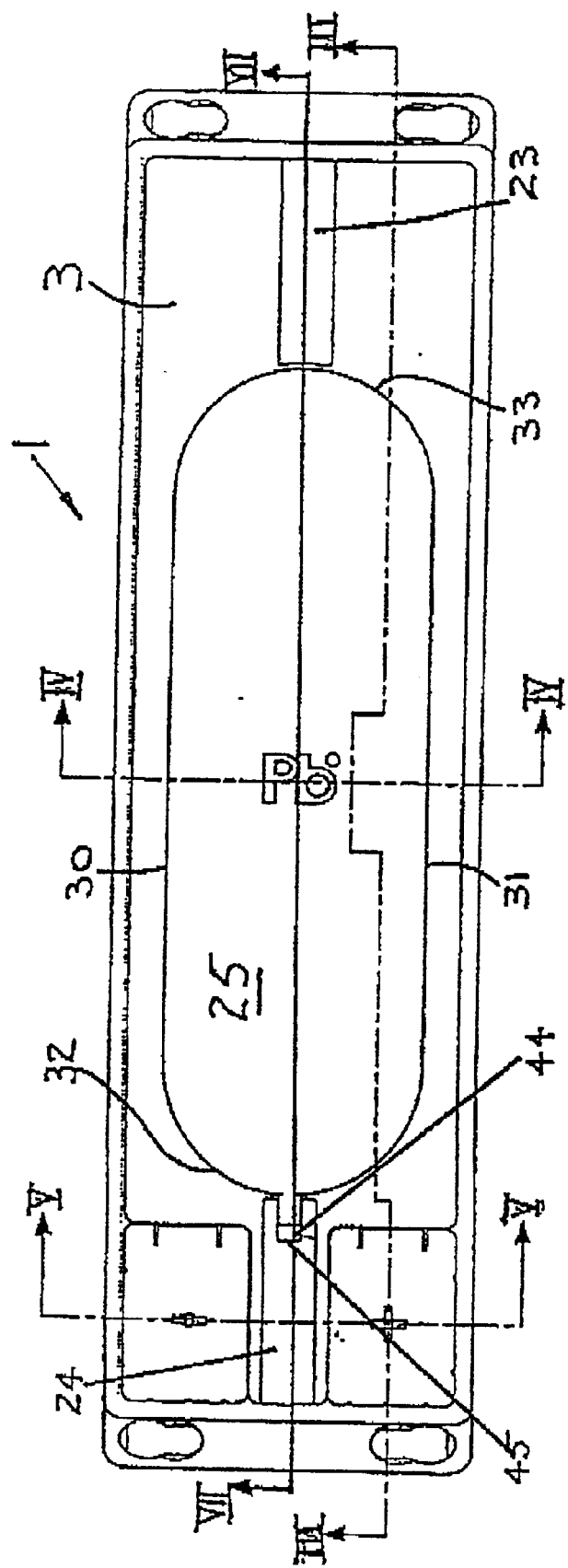
FIG. 2 is a plan view of the battery shown in FIG. 1 on an enlarged scale.

At the centre of one semi-circular end part 32 (the left-hand end as shown in FIG. 2) the cover 25 is formed with a horizontally-extending nozzle 43 for receiving the end of a flexible tube (not shown). An external enlargement 44 is provided adjacent the nozzle mouth 45 to provide a means to prevent the tube becoming detached. The nozzle mouth 45 lies in the channel 24 between the terminals 6 and 7 and their associated shields 9 and 10 so that the tube passes between the terminals and associated shields. As can be seen in FIG. 8 the nozzle has an internal tapered passage 46, the end of which terminates in a cylindrical recess 47 having a shoulder 48 adjacent the upper part thereof. A flame arrester 49 comprising a porous polyethylene or ceramic disc 49 seats within the recess 47 on the shoulder 48 so that a small gap 50 is provided between the arrester 49 and the upper part of the recess 51. The flame arrester 49 is a push fit in the recess 47 and is also held in position on the upper edges 52 of the four parts of the circular flange 28 of the arrester support.

In use, gas escapes from the cells of the battery through the valves and collects in the recess under the cover. As pressure increases the gas passes through the flame arrester, through the small gap, along the nozzle passage and then through the tube to a safe location away from the battery. If the battery is positioned on racking with the terminals near the front thereof, the tube will also project from the front.

In the embodiment illustrated the cover may be positioned in the lid recess the opposite way round i e with the nozzle at the right-hand side as shown in FIG. 2, thus giving the user a choice of operation. The tube attached to the nozzle in this position will thus pass across the short side of the battery further from that where the terminals are located. Thus if the terminals are located at the front of standard racking, the gases escaping from the cells through the flame arrester are led away to the rear of the racking. This may be advantageous.

What is claimed is:

1. A battery casing (1) comprising a lid (3) having a top surface and a recess (12) inset into the said top surface, a vent (17) at the base of the recess through which gas is expelled from the battery, a cover (25) having opposite ends for sealingly covering said recess, sealing means to provide a seal between the cover and the recess, a gas collection space being defined within the covered recess, and a gas guide means (43) formed integrally with and in one position within the cover for guiding gas from the collection space away from the battery through one end of the cover, wherein the cover and therefore the gas guide means may be positioned in more than one orientation to the battery casing.

2. A battery casing according to claim 1, comprising a plurality of vents (17) at the base of the recess, one for each of the battery cells.

3. A battery casing according to claim 1 wherein the guide means comprises a nozzle protruding from the cover and to which a flexible tube may be attached.

4. A battery casing according to claim 3, wherein the lid has a channel (23, 24) extending from the recess in which the guide means is located.

5. A battery casing according to claim 4, wherein the lid has a plurality of channels extending from the recess in at least one of which the guide means is located.

6. A battery casing according to claim 1, wherein the cover is removable from the lid.

7. A battery casing according to claim 1 wherein the cover and the lid each has two straight parallel sides and two semi-circular ends, the guide means being located in the middle of one semi-circular end of the lid.

8. A battery casing (1) comprising a lid (3) having a top surface and a recess (12) inset into the said top surface, a vent (17) at the base of the recess through which gas is expelled from the battery, a cover (25) having opposite ends for sealingly covering said recess, sealing means to provide a seal between the cover and the recess, a gas collection space being defined within the covered recess, and a gas guide (43) formed integrally with and in one position within the cover for guiding gas from the collection space away from the battery through one end of the cover, wherein the cover and therefore the gas guide means may be positioned in more than one orientation to the battery casing, and wherein the top surface of the cover lies no higher than the adjacent surface of the battery.

9. A battery casing according to claim 8, comprising a plurality of vents (17) at the base of the recess, one for each of the battery cells.

10. A battery casing according to claim 8, wherein the guide comprises a nozzle protruding from the cover and to which a flexible tube may be attached.

11. A battery casing according to claim 10, wherein the lid has a channel (23, 24) extending from the recess in which the guide is located.

12. A battery casing according to claim 11, wherein the lid has a plurality of channels extending from the recess in at least one of which the guide is located.

13. A battery casing according to claim 8, wherein the cover is removable from the lid.

14. A battery casing according to claim 8, wherein the cover and the lid each has two straight parallel sides and two semi-circular ends, the guide being located in the middle of one semi-circular end of the lid.

* * * * *